United States Patent [19]

Negrin

[11] Patent Number: 5,627,755
[45] Date of Patent: May 6, 1997

[54] METHOD AND SYSTEM FOR DETECTING AND COMPENSATING FOR ROUGH ROADS IN AN ANTI-LOCK BRAKE SYSTEM

[75] Inventor: Dan Negrin, Wiesbaden, Germany

[73] Assignee: Kelsey-Hayes Company, Livonia, Mich.

[21] Appl. No.: 303,379

[22] Filed: Sep. 9, 1994

[51] Int. Cl.$^6$ .................... G06F 7/70; B60T 8/34
[52] U.S. Cl. .................... 364/426.018; 364/426.01; 303/178; 303/162; 303/195; 303/113.4; 180/197
[58] Field of Search .................... 364/426.03, 426.02; 180/197; 303/95, 96, 97, 100, 103, 105, 106, 107, 110, 115.2, 194, 173, 113.1, 167, 187, 162, 116.1, 119.1, 158–169, 195, 191–197

[56] References Cited

U.S. PATENT DOCUMENTS

| | | | |
|---|---|---|---|
| 3,604,761 | 9/1971 | Okamoto et al. | 303/21 CG |
| 3,717,384 | 2/1973 | Harned | 303/21 BE |
| 3,953,080 | 4/1976 | Bremer | 303/178 |
| 4,668,022 | 5/1987 | Sato | 303/100 |
| 4,672,547 | 6/1987 | Masaki et al. | 364/426.02 |
| 4,701,855 | 10/1987 | Fennel | 364/426.02 |
| 4,790,607 | 12/1988 | Atkins | 303/195 |
| 4,807,133 | 2/1989 | Shimanuki et al. | 364/426.02 |
| 4,883,325 | 11/1989 | Shimanuki et al. | 303/96 |
| 4,924,396 | 5/1990 | Fujioka et al. | 364/426.03 |
| 4,929,034 | 5/1990 | Braschel et al. | 303/103 |
| 4,989,165 | 1/1991 | Watanabe et al. | 364/565 |
| 5,085,288 | 2/1992 | Shiraishi et al. | 180/197 |
| 5,105,359 | 4/1992 | Okubo | 364/426.02 |
| 5,117,934 | 6/1992 | Tsuyama et al. | 180/197 |
| 5,132,906 | 7/1992 | Sol et al. | 364/426.02 |
| 5,148,368 | 9/1992 | Okubo | 364/426.02 |
| 5,222,570 | 6/1993 | Kawamura et al. | 364/424.05 |
| 5,236,255 | 8/1993 | Kuwana et al. | 303/106 |
| 5,249,851 | 10/1993 | Johnsen | 303/104 |
| 5,267,162 | 11/1993 | Ichikawa et al. | 364/426.02 |
| 5,267,784 | 12/1993 | Müller et al. | 303/103 |
| 5,273,349 | 12/1993 | Kidston | 303/162 |
| 5,281,009 | 1/1994 | Kidston et al. | 303/162 |
| 5,293,315 | 3/1994 | Kolbe et al. | 364/426.02 |
| 5,308,153 | 5/1994 | Kidston et al. | 303/162 |
| 5,357,434 | 10/1994 | Zimmer et al. | 364/426.02 |
| 5,385,394 | 1/1995 | Leppek et al. | 303/115.2 |
| 5,390,991 | 2/1995 | Tozu et al. | 303/97 |
| 5,413,405 | 5/1995 | Okazaki | 303/103 |
| 5,474,368 | 12/1995 | Sano | 303/163 |
| 5,483,448 | 1/1996 | Liubakka et al. | 364/424.05 |
| 5,511,862 | 4/1996 | Fujioka | 303/113.4 |
| 5,518,307 | 5/1996 | Okazaki | 303/159 |

FOREIGN PATENT DOCUMENTS

441122A3  8/1991  European Pat. Off. .

*Primary Examiner*—Kevin J. Teska
*Assistant Examiner*—Jacques Louis-Jacques
*Attorney, Agent, or Firm*—MacMillan, Sobanski & Todd

[57] ABSTRACT

Methods and systems for detecting and compensating for rough roads in an anti-lock brake system (ABS) through the use of a desensitizer factor which is utilized in a slip threshold desensitization circuit to desensitize slip threshold are described. The desensitizer factor is dependent on wheel acceleration. The desensitizer factor normally decays over time as long as the current value of the desensitizer factor is greater than a peak value of wheel acceleration. Otherwise, the desensitizer factor assumes the peak value of wheel acceleration, thereby "capturing" the peaks of wheel acceleration. The system includes a wheel speed sensor for measuring the speed of each of the vehicle wheels, and a control unit for determining whether the anti-lock brake system should be activated based on the value of the desensitized slip threshold. The desensitized slip threshold is utilized by the ABS to compensate for vehicle travel on rough roads.

8 Claims, 5 Drawing Sheets

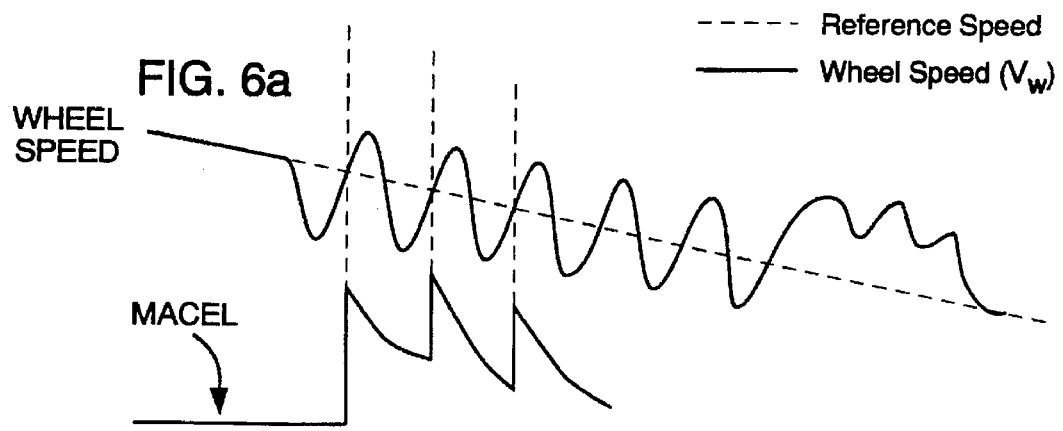
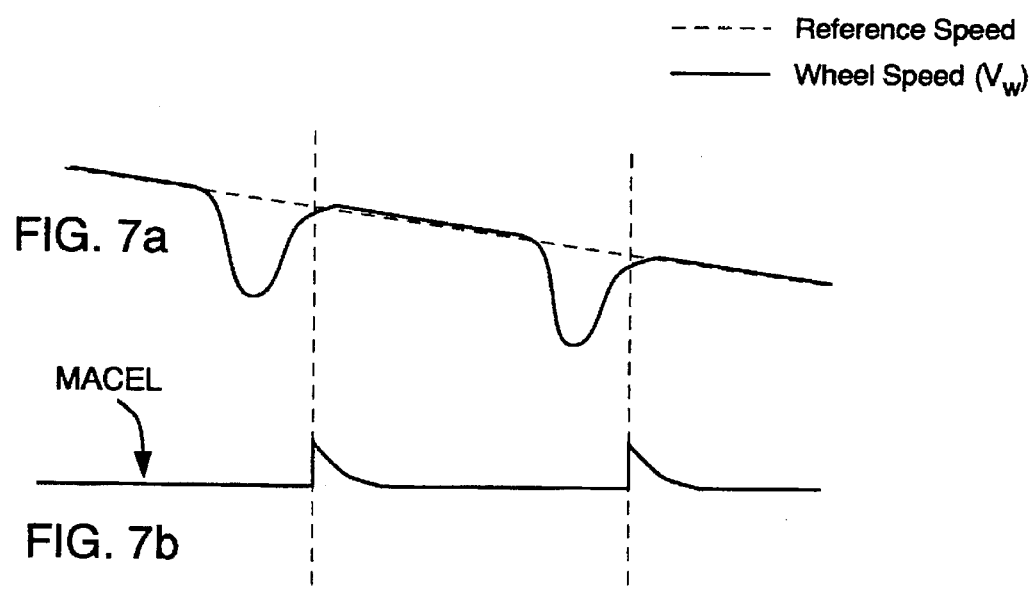

METHOD AND SYSTEM FOR DETECTING AND COMPENSATING FOR ROUGH ROADS IN AN ANTI-LOCK BRAKE SYSTEM

TECHNICAL FIELD

This invention relates generally to vehicle anti-lock brake systems (ABS). More particularly, this invention relates to methods and systems for detecting and compensating for rough roads in an anti-lock brake system.

BACKGROUND ART

In an effort to protect vehicle operators and occupants, vehicle manufacturers and their suppliers are increasingly designing and manufacturing vehicles with additional and improved safety features. One such safety feature that has been incorporated into a number of vehicle types is anti-lock braking, which can take a variety of forms.

Vehicle anti-lock brake systems are designed to maximize the ability of a vehicle operator to bring a vehicle to a controlled stop on any type of road surface. The system accomplishes this goal by preventing the vehicle brakes from prematurely halting vehicle wheel rotation, or "locking" the vehicle wheels, regardless of the road surface and the pressure applied to the brake pedal by the vehicle operator.

Typical vehicle anti-lock brake systems include vehicle wheel speed sensors for providing inputs to an anti-lock brake system control unit. The control unit controls anti-lock brake system control valves interposed between the brake master cylinder and the individual wheel brakes of an hydraulic brake circuit. Such control valves include isolation valves and dump valves. The control valves, in turn, regulate hydraulic brake fluid pressure in the individual wheel brakes to implement anti-lock braking.

In operation, one or more of the vehicle wheel speed sensors not only measures the vehicle wheel speed, but also provides input to the control unit for determining the vehicle speed. The control unit monitors the vehicle and vehicle wheel speeds for an indication of an anti-lock braking event. First, based upon the vehicle speed, the control unit typically determines a slip threshold. Using the vehicle velocity as a reference, slip threshold may be expressed as the difference between a selected velocity and the vehicle velocity.

Next, the control unit compares the vehicle wheel velocity to the vehicle velocity to determine a departure depth. Again using the vehicle velocity as a reference, departure depth may be expressed as the difference between the vehicle velocity and the wheel velocity. During normal vehicle braking, the wheel velocity closely matches the vehicle velocity. Thus, during normal vehicle braking, the difference between the vehicle velocity and the wheel velocity is nominal.

However, during an anti-lock braking event, the wheel velocity decreases significantly below, or "departs" from, the vehicle reference velocity. This is called "departure". In such a situation, as for example during hard braking on an ice covered road, the frictional force between the vehicle brake pads and the vehicle wheel exceeds that between the vehicle wheel and the road surface. Uncontrolled, such a frictional force differential causes the vehicle wheel to cease rotating, or to "lock."

In turn, locking causes the vehicle wheels to slip or "skid", rather than roll, over the road surface. Such vehicle wheel skidding dramatically reduces traction and the ability of the vehicle operator to bring the vehicle to a controlled stop.

To prevent such vehicle wheel lock and the accompanying problems, the control unit of an anti-lock brake system activates the anti-lock brake system isolation valve to regulate hydraulic brake fluid pressure in the individual wheel brakes during an anti-lock braking event. More specifically, the control unit compares the departure depth to the slip threshold and actuates the isolation valve when the departure depth exceeds the slip threshold in order to isolate the individual vehicle wheel brakes in the hydraulic brake circuit from the master cylinder, thereby halting any increase in brake fluid pressure in the vehicle wheel brakes and preventing incipient vehicle wheel lock.

More particularly, when, during vehicle braking, the departure depth exceeds the slip threshold, the isolation valve isolates brake fluid in the individual wheel brake from the increasing brake fluid pressure in the master cylinder in order to hold brake fluid pressure in the wheel brake constant. If the isolated brake fluid pressure in the wheel brake is still high enough to cause incipient wheel lock, the anti-lock brake system then bleeds, or dumps, brake fluid from the wheel brake through the dump valve to reduce brake fluid pressure therein.

Thereafter, the anti-lock brake system typically holds brake fluid pressure in the wheel brake constant until such time as the departure depth no longer exceeds the slip threshold, indicating that the vehicle wheel is again traveling at or near the velocity of the vehicle. At that time, the anti-lock brake system then increases, or builds, brake fluid thereto. Reapplication of brake fluid to the wheel brake may be at a steep or gradual rate, or some combination thereof, depending upon the circumstances or the control desired.

To maintain smooth braking and optimum vehicle control, some reapplication of brake fluid to the wheel brakes must be undertaken where the isolation of the brake fluid in the wheel brakes from that in the master cylinder has been prolonged, for example on the order of one hundred milliseconds or greater. Such reapplication must be undertaken in order to raise brake fluid pressure in the wheel brake to a level approximating that in the master cylinder before the isolation valve may deisolate the wheel brake from the master cylinder. A "normal" ABS wheel trace is illustrated in FIG. 1.

One problem associated with anti-lock brake systems as described above is their tendency toward false, or premature, activation. Premature activation can occur in a number of circumstances, such as where a road surface is partially ice covered or bumpy and individual vehicle wheels experience different coefficients of friction during braking. Typical anti-lock brake systems activate when the departure depth of any one of the vehicle wheels exceeds the slip threshold, despite the fact that the wheel would not have experienced excessive slip. A "rough" road ABS wheel trace is illustrated in FIG. 2.

Moreover, typical anti-lock brake systems decrease the slip threshold after activation in order to increase anti-lock brake system sensitivity during an anti-lock braking event. Under normal conditions, this action improves the ability of the vehicle operator to slow or stop the vehicle in a controlled fashion.

The U.S. Pat. No. 5,117,934, to Tsuyama et al, discloses a slip control system which detects rough roads and, in turn, increases its threshold slip ratio.

The U.S. Pat. No. 4,672,547, to Masaki et al, discloses an anti-lock control system which compensates for rough road surfaces based on wheel acceleration. A first count value is incremented in response to detection of wheel acceleration exceeding a predetermined value. When the first count of the value exceeds a reference count within a preset period of time, the road is interpreted as having a rough surface.

Other anti-skid or anti-lock control systems which are generally related to the present invention are disclosed in U.S. Pat. Nos. 3,604,761; 3,717,384; 4,668,022; 4,701,855, 4,807,133; 4,883,325; 4,924,396; 4,929,034; 4,989,165; 5,085,288; 5,105,359; 5,148,368; 5,222,570; 5,267,162; 5,267,784; and EP 441 122 A3.

SUMMARY OF THE INVENTION

An object of the present invention is to provide a method and system for detecting and compensating for rough roads through the use of a desensitizer factor which is utilized in a slip threshold desensitization circuit to desensitize slip threshold.

Another object of the present invention is to provide a method and system for detecting and compensating for rough roads through the use of a desensitizer factor which normally decays in value over time but assumes a peak value of wheel acceleration when the peak value of wheel acceleration exceeds the current value of the desensitizer factor.

In carrying out the above objects and other objects of the present invention, a method is provided for detecting and compensating for rough roads during vehicle travel. The method includes the steps of determining vehicle speed and determining a current value of slip threshold based on the vehicle speed. The method also includes the steps of generating at least one wheel speed signal representing vehicle wheel speed, processing the at least one wheel speed signal and calculating acceleration data representing wheel acceleration from the at least one processed wheel speed signal. The method further includes the steps of processing the acceleration data to obtain a peak value of wheel acceleration, and determining a current value of a desensitizer factor and whether the peak value of the wheel acceleration is greater than the current value of the desensitizer factor. The method also includes the step of changing the current value of the desensitizer factor to a final value which is substantially equal to the peak value of wheel acceleration when the peak value of wheel acceleration is greater than the current value of the desensitizer factor. The method finally includes the step of determining a desensitized slip threshold based on the current value of the slip threshold and the final value of the desensitizer factor, the desensitized slip threshold being utilized by the ABS to compensate for vehicle travel on rough roads.

Preferably, the method further includes the step of decreasing the current value of the desensitizer factor to obtain the final value of the desensitizer factor if the peak value of wheel acceleration is less than or equal to the current value of the desensitizer factor.

Still, preferably, the current value of the desensitizer factor decays over time.

Also, preferably, the step of determining the final slip threshold includes the step of summing the current value of the slip threshold and the final value of the desensitizer factor.

Further in carrying out the above objects and other objects of the present invention, a system is provided for carrying out the above method steps.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIGS. 6a and 6b are graphs of wheel speed, wheel reference speed and MACEL versus time for a "rough" road; and FIGS. 7a and 7b are graphs of wheel speed, wheel reference speed and MACEL versus time for a "normal" road.

BEST MODE FOR CARRYING OUT THE INVENTION

Figure 1:
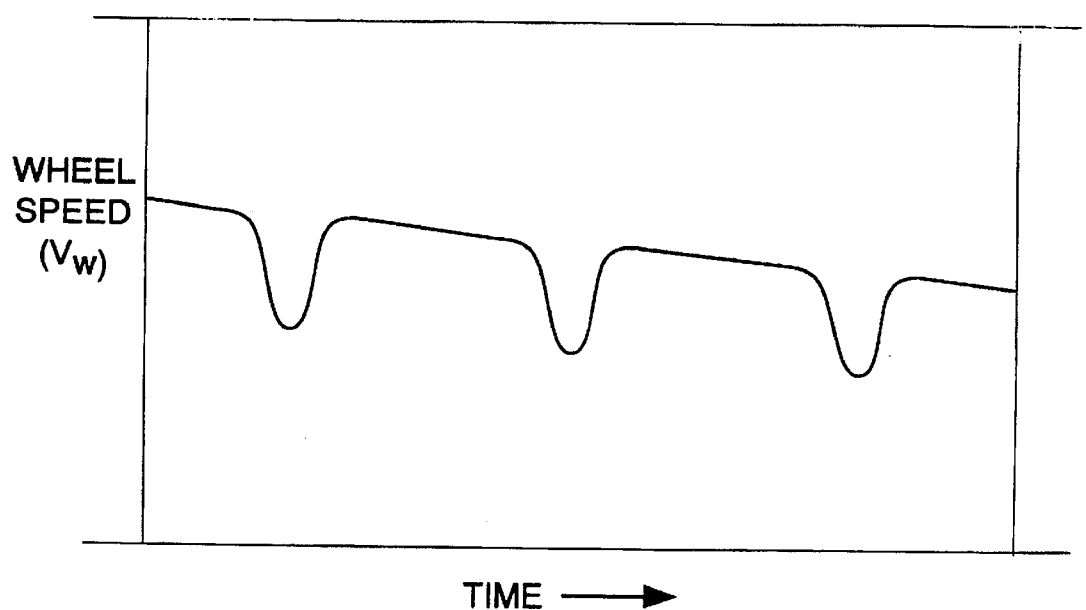
FIG. 1 is a graph of wheel speed ($V_w$) versus time for a smooth road during normal ABS operation.
Figure 2:
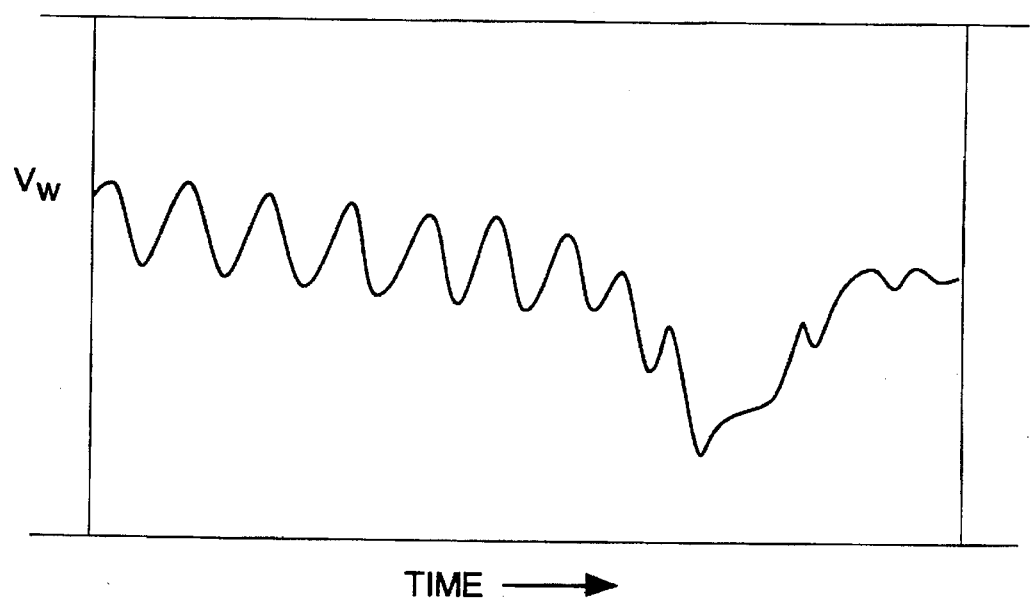
FIG. 2 is a graph of wheel speed ($V_w$) versus time for a "rough road" during normal ABS operation.
Figure 3:
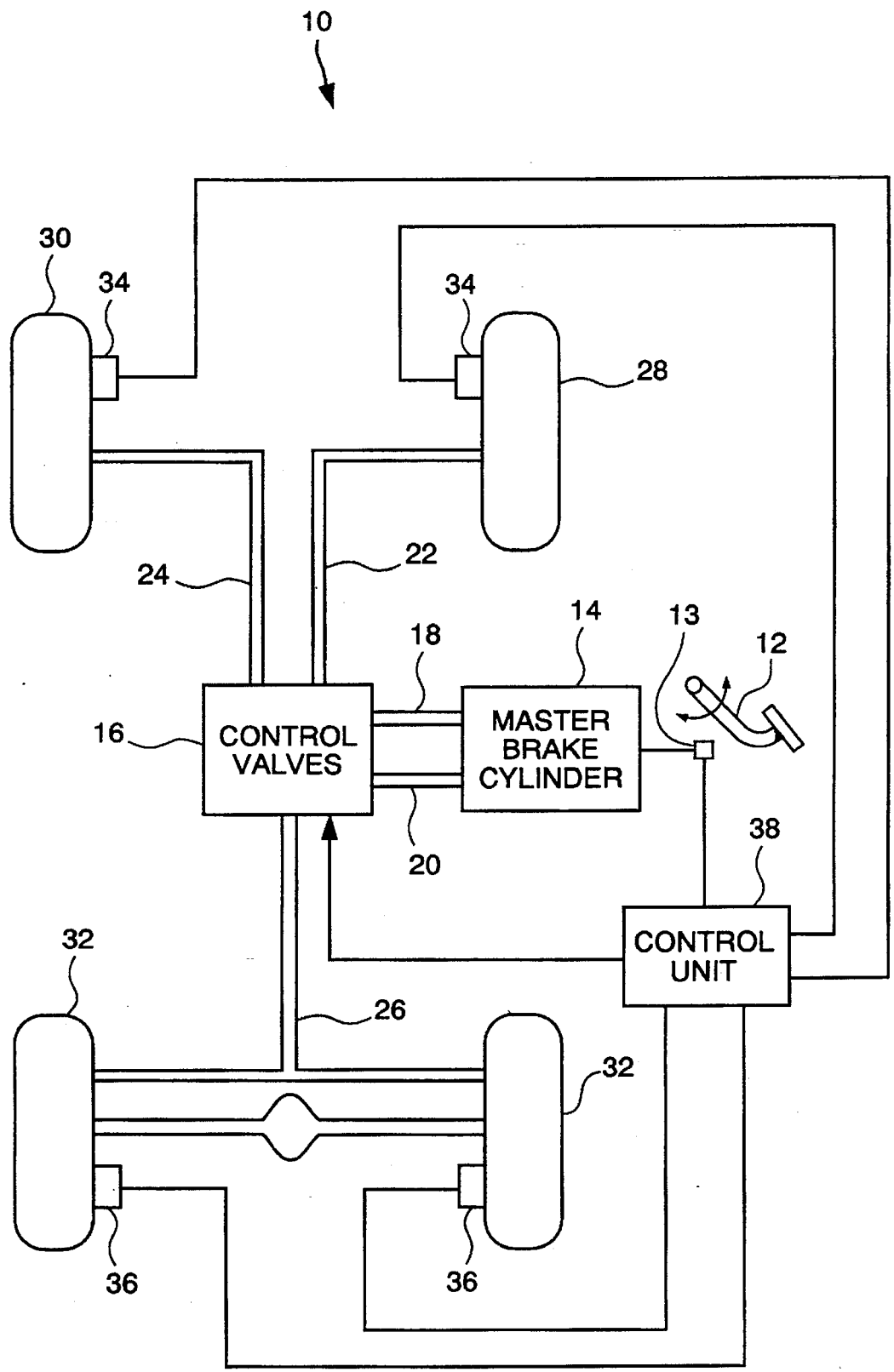
FIG. 3 is a schematic diagram of a vehicle and an interconnected system of the present invention in a vehicle ABS.

Referring now to FIG. 3, a schematic diagram of a motor vehicle and the system of the present invention is shown, denoted generally by reference numeral 10, in conjunction with an ordinary passenger vehicle anti-lock brake system (ABS). The anti-lock brake system includes a brake pedal 12, a brake switch 13, a brake master cylinder 14, control valves 16, brake fluid conduits 18, 20, 22, 24 and 26, as well as a right front wheel 28, a left front wheel 30, and a pair of rear wheels 32.

The system 10 of the present invention includes a pair of vehicle wheel speed sensors 34 for measuring the velocity of each of the front wheels 28 and 30, and a pair of vehicle wheel speed sensors 36 for measuring the velocity of each of the rear wheels 32. The system 10 further comprises an anti-lock brake system control unit 38. Each of the wheel sensors 34 and 36 are operatively connected to the control unit 38, which is itself operatively connected to the anti-lock brake system control valves 16. Such operative connections are preferably electrical, but may also be other types of connections, such as fiber optic.

As is well known in the art, each of the wheel speed sensors 34 and 36 may comprise a stationary variable reluctance sensor (not shown) positioned adjacent a toothed wheel (not shown) which rotates with its respective vehicle wheel 28, 30, 32. The variable reluctance sensors each generate a pulsed signal whose frequency varies directly with the speed of the respective vehicle wheels 28, 30, 32. Other well known wheel speed sensor configurations may also be employed.

Figure 4:
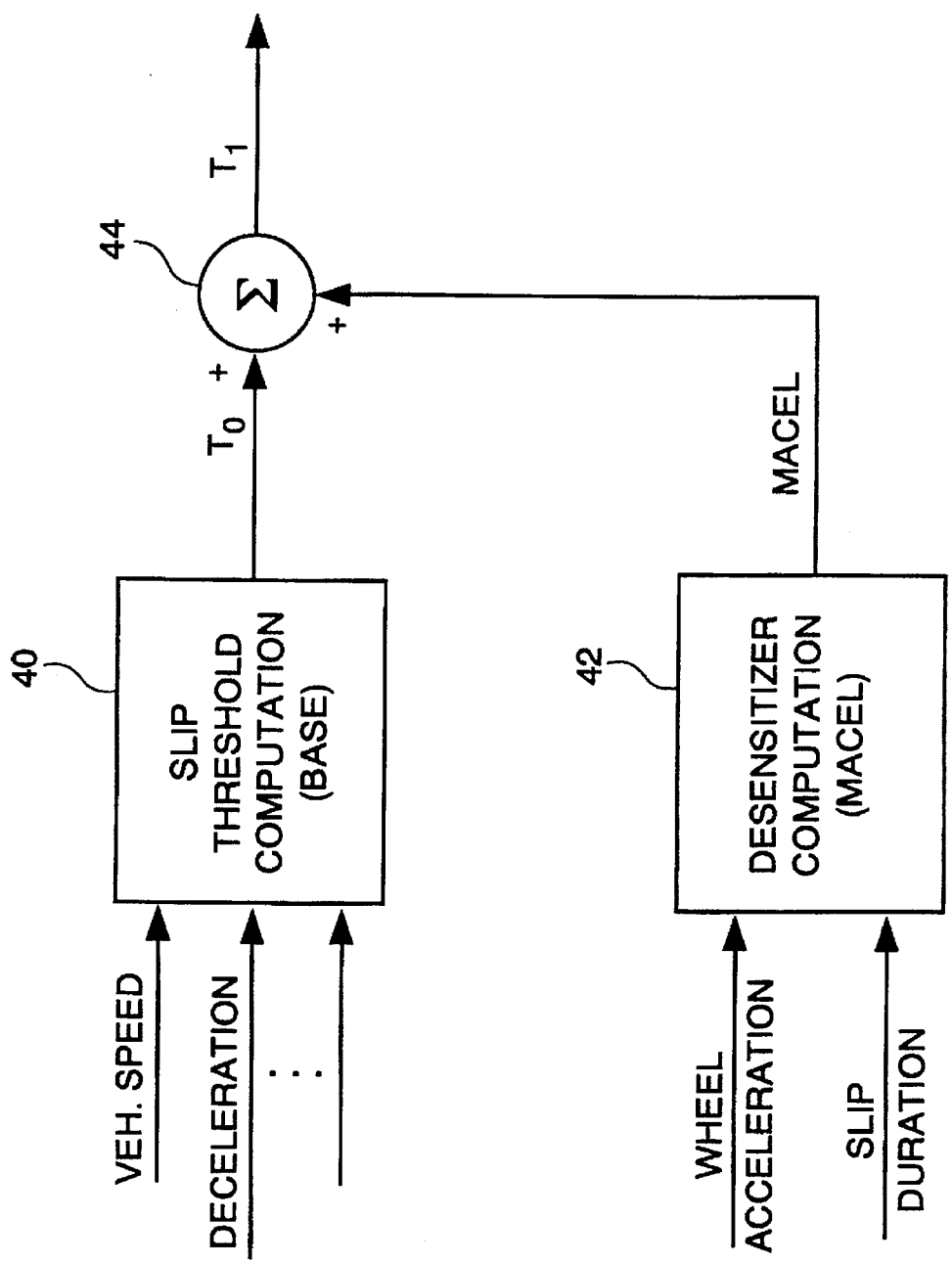
FIG. 4 is a block diagram illustrating a slip threshold desensitization circuit of the present invention for detecting and compensating for rough roads.

The control unit 38 takes the form of a commercially available microprocessor. Once programmed, the microprocessor control unit 38 functions as a control means for setting a base or current slip threshold level ($T_0$) for activating the ABS on the front wheels 28 and 30 at a predetermined level. As described in detail hereinbelow, the current slip threshold level ($T_0$) is increased to a second level or a desensitized slip threshold ($T_1$), as illustrated in FIG. 4. If peak wheel acceleration is greater than a current value of a desensitizer factor then the desensitizer factor assumes the peak value of the wheel acceleration thereby greatly increasing the slip threshold. This prevents the ABS from going active due to a "rough" road.

The method includes the step of determining vehicle speed, such as from the history of wheel velocity information provided by the wheel speed sensors 34 and 36.

First and second speed signals representing the speeds of the first and second front wheels, 28 and 30, respectively, are generated by the front wheel sensors 34 as previously described. Also, third and fourth signals representing the speeds of first and second rear wheels 32 of the vehicle, respectively, are generated by the rear wheel sensors 36, also as previously described.

The first, second, third and fourth signals are processed by the control unit 38 to calculate acceleration and deceleration data representing acceleration and deceleration of each of the wheels 28, 30 and 32.

Figure 5A:
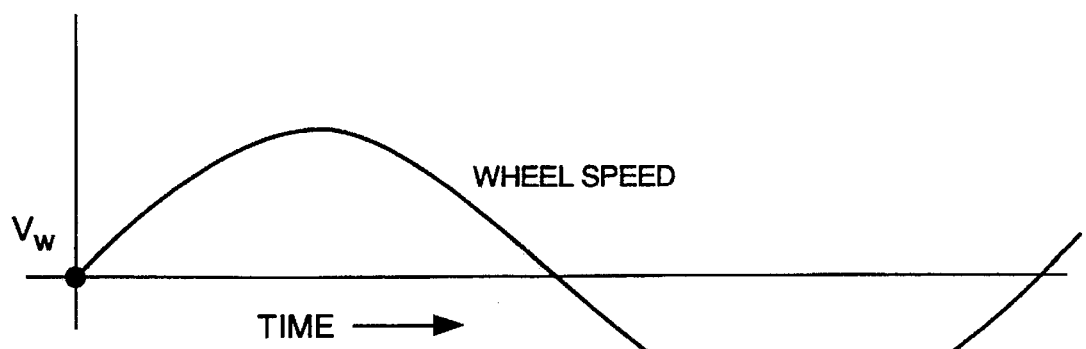
FIGS. 5a through 5c are graphs of wheel speed, wheel acceleration and MACEL versus time which collectively illustrate MACEL computation.
Figure 5B:
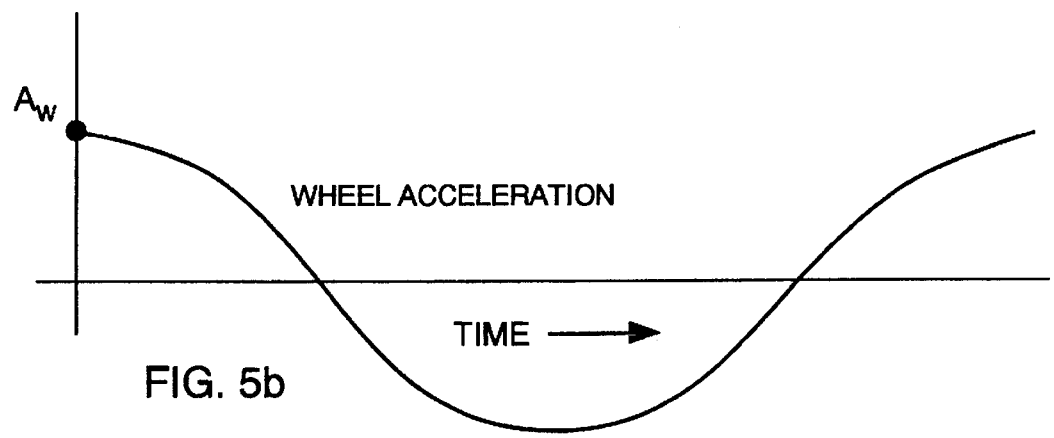

As illustrated in FIG. 4, within a slip threshold desensitization circuit of the control unit 38, there is computed at block 40 a current slip threshold ($T_0$) which is based on vehicle speed and wheel deceleration data obtained from each wheel. Preferably, wheel deceleration is computed with a digital filter operating on filtered wheel speed. Also, within the control unit 38 at block 42 there is calculated MACEL or a desensitizer factor which is based on wheel acceleration and slip duration. Slip duration is the amount of time that a wheel is determined to be in slip (i.e. below the calculated slip threshold). A desensitized slip threshold ($T_1$) is determined as the summation of $T_0$ and MACEL at a summing block Referring now to FIGS. 5a through 5c, there is illustrated how MACEL (i.e. the desensitizer factor) is computed. Wheel speed ($V_w$) is illustrated in FIG. 5a, wheel acceleration as illustrated in FIG. 5b, and a base desensitizer factor MACEL as illustrated in FIG. 5c.

Figure 5C:
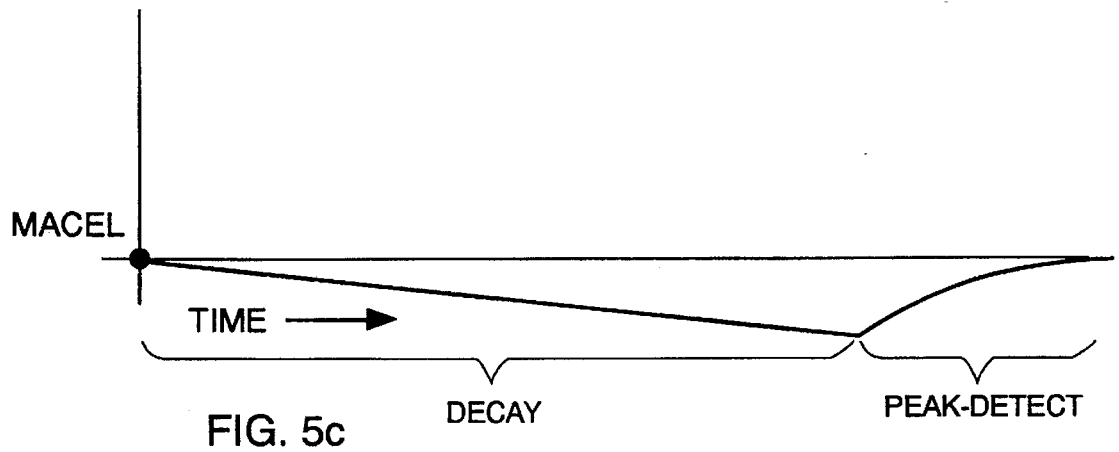

As illustrated in FIG. 5c, MACEL normally decays over time as long as MACEL is greater than wheel acceleration ($A_w$), the final value of the desensitizer factor $MACEL_k = \lambda \, MACEL_{k-1}$ where $\lambda$ is slightly less than 1, for example 15/16 or 31/32.

However, if a peak value of wheel acceleration $A_w$ is greater than MACEL, than MACEL=the peak value of wheel acceleration, $A_w$, as illustrated in the right hand portion of FIG. 5c which represents a peak detection.

Referring now to FIGS. 6a and 6b, there is illustrated how MACEL is calculated based on wheel speed for a rough road. Wheel speed references or reference speeds for the wheels are decayed so as to ensure maximum braking efficiency while providing a reference for slip detection. As illustrated at block 40, vehicle deceleration is used to set the base line decay. This global decay is calculated from deceleration of the wheels. Preferably, the smallest positive deceleration of all of the wheels not in a departure is used as global decay value.

Referring to FIGS. 7a and 7b, there is illustrated how MACEL is calculated based on wheel speed for a relatively smooth road.

Consequently, it can be seen that the final desensitized slip threshold ($T_1$) is based on the current value of the slip threshold ($T_0$) and the final value of the desensitizer factor (MACEL) which, in turn, is dependent on the peak value of wheel acceleration. The final desensitizer slip threshold is utilized by the ABS to compensate for vehicle travel on rough roads.

It is to be understood that the present invention has been described in an illustrative manner and the terminology which has been used is intended to be in the nature of words of description rather than of limitation. Obviously, many modifications and variations of the present invention are possible in light of the above teachings. Therefore, it is also to be understood that, within the scope of the following claims, the invention may be practiced in other ways than that specifically described.

What is claimed is:

1. In a vehicle anti-lock brake system, a method for detecting and compensating for rough roads during vehicle travel, the method comprising the steps of:

determining vehicle speed;

determining a current value of slip threshold based on the vehicle speed;

generating at least one wheel speed signal representing vehicle wheel speed;

processing the at least one wheel speed signal;

calculating acceleration data representing wheel acceleration from the at least one processed wheel speed signal;

processing the acceleration data to obtain a peak value of wheel acceleration;

determining a current value of a desensitizer factor, and whether the peak value of the wheel acceleration is greater than the current value of the desensitizer factor;

changing the current value of the desensitizer factor to a final value which is substantially equal to the peak value of wheel acceleration when the peak value of wheel acceleration is greater than the current value of the desensitizing factor; and determining a desensitized slip threshold based on the current value of the slip threshold and the final value of the desensitizer factor, the desensitized slip threshold being utilized by the anti-lock brake system to compensate for vehicle travel on rough roads.

2. The method of claim 1 further comprising the step of decreasing the current value of the desensitizer factor to obtain the final value of the desensitizer factor if the peak value of wheel acceleration is less than or equal to the current value of the desensitizer factor.

3. The method of claim 2 wherein the current value of the desensitizer factor decays over time.

4. The method of claim 1 wherein the step of determining the desensitized slip threshold includes the step of summing the current value of the slip threshold and the final value of the desensitizer factor.

5. In a vehicle anti-lock brake system, a system for detecting and compensating for rough roads during vehicle travel, the system comprising:

generating means for generating at least one wheel speed signal representing vehicle wheel speed; and a control unit coupled to the generating means for:

determining vehicle speed and determining a current value of slip threshold based on the vehicle speed;

processing the at least one wheel speed signal;

calculating acceleration data representing wheel acceleration from the at least one processed wheel speed signal;

processing the acceleration data to obtain a peak value of wheel acceleration;

determining a current value of a desensitizer factor and whether the peak value of wheel acceleration is greater than the current value of the desensitizer factor;

changing the current value of the desensitizer factor to a final value which is substantially equal to the peak value of wheel acceleration when the peak value of wheel acceleration is greater than the current value of the desensitizer factor; and determining a desensitized slip threshold based on the current value of the slip threshold and the final value of the desensitizer factor, the desensitized slip threshold being utilized by the anti-lock brake system to compensate for vehicle travel on rough roads.

6. The system of claim 5 wherein the control unit also decreases the current value of the desensitizer factor to obtain the final value of the desensitizer factor if the value of wheel acceleration is less than or equal to the current value of the desensitizer factor.

7. The system of claim 6 wherein the current value of the desensitizer factor decays over time.

8. The system of claim 5 wherein the control unit includes a slip threshold desensitization circuit to desensitize the current value of the slip threshold by adding the final value of the desensitizer factor to the current value of the slip threshold.

* * * * *